Patented July 29, 1924.

1,502,905

UNITED STATES PATENT OFFICE.

SALADINE EUGENE COLGIN, OF DALLAS, TEXAS.

COMPOUND FOR CURING AND COLORING MEATS.

No Drawing. Application filed May 15, 1922. Serial No. 561,023.

*To all whom it may concern:*

Be it known that I, SALADINE EUGENE COLGIN, a citizen of the United States, residing at Dallas, in the county of Dallas and State of Texas, have invented new and useful Improvements in Compounds for Curing and Coloring Meats, of which the following is a specification.

The present invention pertains to the meat curing and coloring compounds and as its primary object seeks to provide a compound or solution, of this nature by means of which meat or any other organic matter may be preserved indefinitely without need of either salting the meat, or putting it through the ordinary smoking process.

It has been found that in using some compounds of the general nature there is nothing to prevent the surface of the meat from drying out too much and consequently becoming quite hard. In a great many cases too the surface of the meat becomes moldy. It is one of the principal objects of the present invention to provide a compound having therein an ingredient or ingredients, in proper proportions, having an affinity for moisture thereby attracting a small amount of the latter from the atmosphere to the surface of the meat and thus preventing its becoming dry and moldy.

Having these, and other objects in view as will appear from the following detailed description of the compound, the same is formed of the following ingredients in the proportions indicated to wit:—

In making one gallon or one hundred and twenty-eight ounces of the compound the following ingredients are employed substantially in the proportions below stated:

Pure sugar, browned sufficiently to impart the desired color without detracting from its sweetening properties, 24.03 ounces; pyroligneous acid, 95.98 ounces; pure table salt, 3.07 ounces; glycerine 4.92 ounces.

In carrying the invention into effect the acid, browned sugar, glycerine and salt are placed in a suitable receptacle containing the water and the mixture thoroughly stirred or agitated until the parts are well blended. It is to be noted that there is about 1 part of glycerine to 25 parts of the other ingredients of the solution.

To give dry salt meats, such as pork and the like, the flavor and appearance of smoked meat, the pork is dipped in the liquid solution, or applied with brush or cloth, and then placed in a drying room and allowed to remain until it is dry. Molding of meats treated with this solution is prevented by the glycerine which attracts moisture in sufficient quantity to keep the surface of the meat from becoming dry or hard. The meat is thus preserved as effectually and more economically than by the usual smoking process.

In curing and coloring beef and other meats, equal parts of pyroligneous acid, browned sugar, plus a small quantity of glycerine and salt, are used in preparing the compound, the meat being dipped in the liquid solution, or applied with brush or cloth and subsequently dried in the manner before stated.

The use of browned sugar has a two fold effect in that it colors the meat and also sugar-cures the meat; the glycerine, having the property of attracting moisture, prevents the meat from becoming too dry and hence becoming moldy; while the pyroligneous acid cures the meat and renders the usual smoking operation unnecessary, thus materially reducing the length of time consumed in curing and preserving and the cost of production.

While the compound is principally employed in the treatment of fresh and salt meats it is obvious that the same may be used with equally good results for curing fish, game and other organic matter.

The proportions above stated may of course be varied somewhat according to the effect it is desired to produce.

Having thus described the invention what is claimed is:—

1. A compound for curing and coloring meat consisting of pyroligneous acid; sugar browned sufficiently to impart color without detracting from the sweetening properties; and glycerine substantially in the proportions specified.

2. A compound for curing and coloring meat consisting of pyroligneous acid; sugar browned sufficiently to impart color without detracting from the sweetening properties; salt; and glycerine substantially in the proportions specified.

3. A compound for curing and coloring meat consisting of the following ingredients substantially in the proportions specified by weight; sugar browned sufficiently to impart color without detracting from its sweetening properties, 24.03 ounces, pyroligneous acid, 95.98 ounces; glycerine 4.92 ounces.

4. A compound for curing and coloring meat consisting of the following ingredients substantially in the proportions specified by weight; sugar browned sufficiently to impart color without detracting from its sweetening properties; 24.03 ounces; pyroligneous acid, 95.98 ounces; glycerine 4.92 ounces and salt, 3.07 ounces.

5. A compound for curing and coloring meat consisting of 1 part of glycerine; and 25 parts of sugar, browned sufficiently to impart color without detracting from sweetening properties and pyroligneous acid in the proportions specified.

6. A compound for curing and coloring meat consisting of 1 part of glycerine; and 25 parts of sugar, browned sufficiently to impart color without detracting from the sweetening properties, pyroligneous acid, and salt combined substantially in the proportions specified.

In testimony whereof I have signed my name to this specification.

S. EUGENE COLGIN.